Dec. 26, 1967   J. B. MURPHY   3,359,618
AXLE BEARING TOOL FOR USE WITH A PRESS
Filed Dec. 10, 1965   3 Sheets-Sheet 2
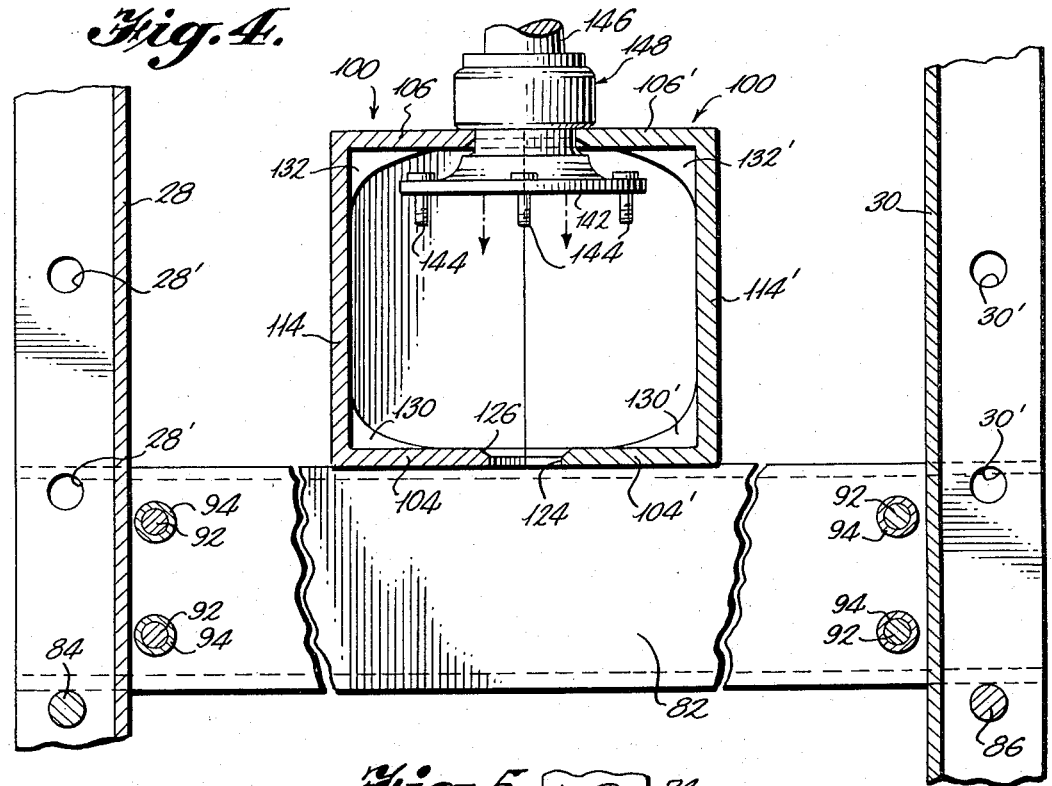
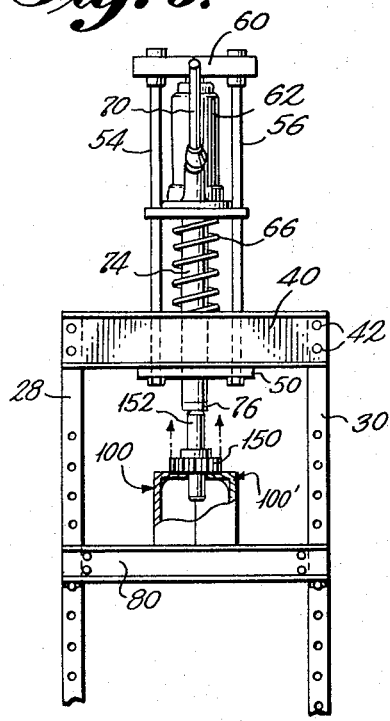
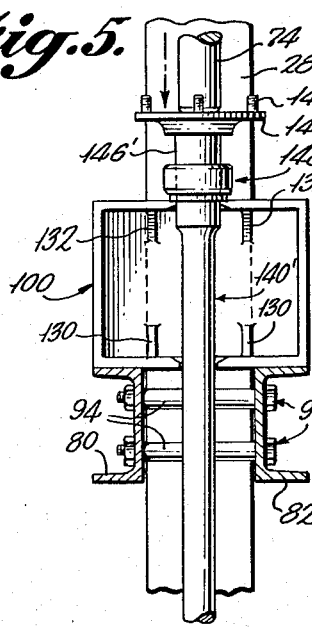
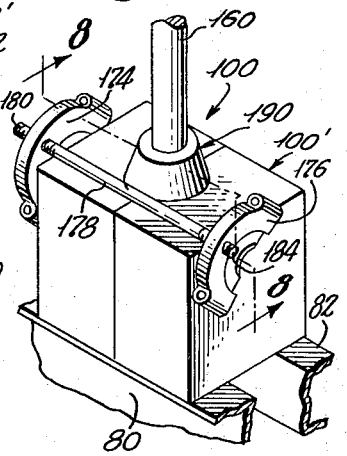
INVENTOR
John B. Murphy
BY Shoemaker and Mattare
ATTORNEYS Dec. 26, 1967   J. B. MURPHY   3,359,618
AXLE BEARING TOOL FOR USE WITH A PRESS
Filed Dec. 10, 1965   3 Sheets-Sheet 3
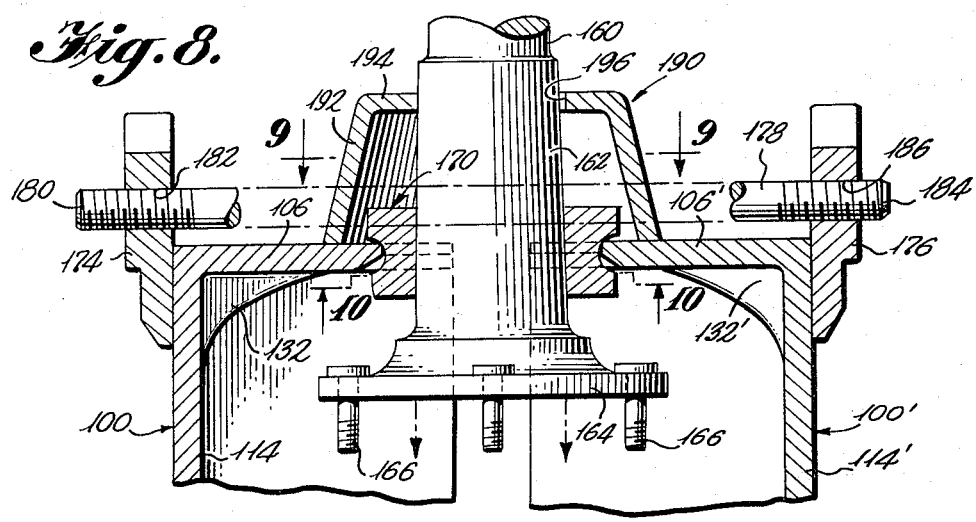
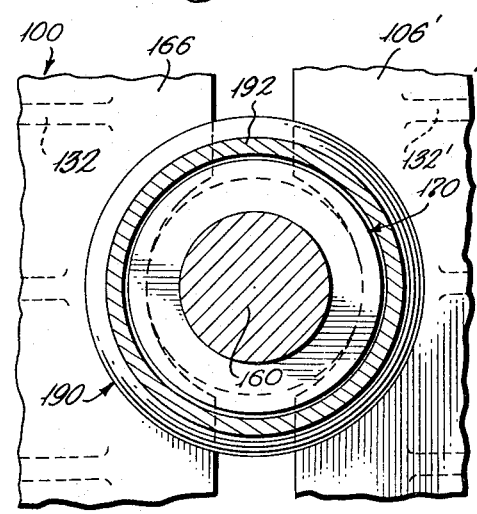
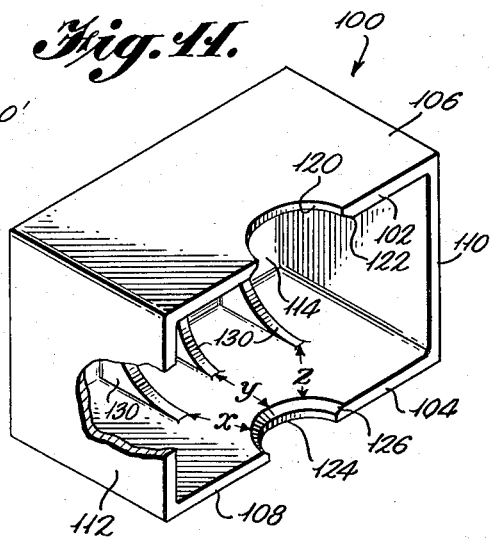
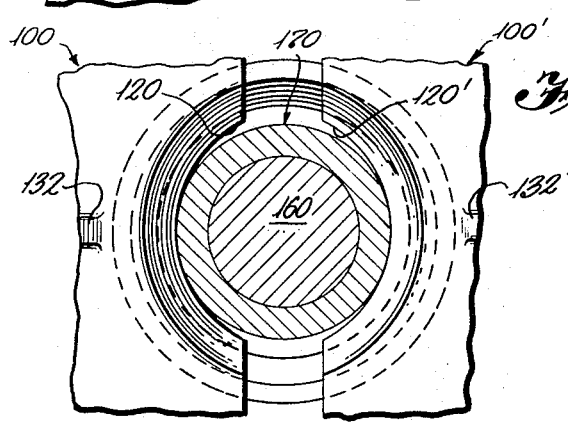
INVENTOR
John B. Murphy
BY Shoemaker and Mattare
ATTORNEYS United States Patent Office 3,359,618
Patented Dec. 26, 1967

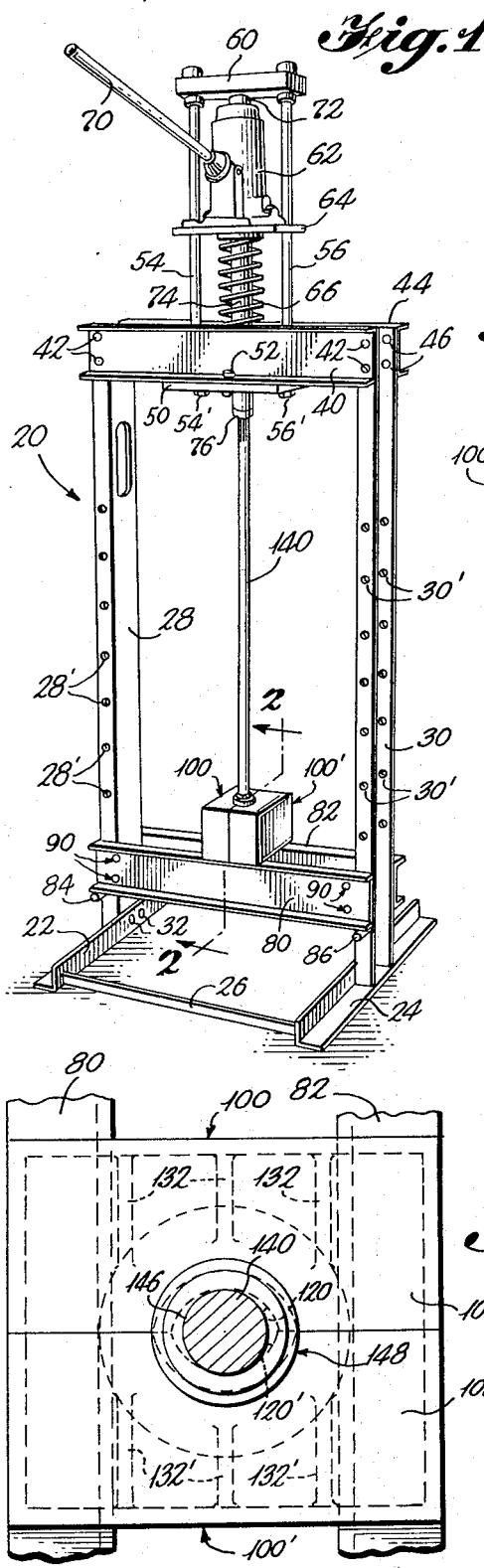

3,359,618
AXLE BEARING TOOL FOR USE
WITH A PRESS
John B. Murphy, P.O. Box 1023, Concord, N.C. 28025
Filed Dec. 10, 1965, Ser. No. 512,902
10 Claims. (Cl. 29—200)

The present invention relates to a new and novel axle bearing tool for use with a press, and more particularly to a tool for removing any friction held means from an associated shaft.

Although the tool is referred to herein as an axle bearing tool, it should be noted at the outset that it may also be employed for removing gears, pulleys, and many other friction held devices from associated shafts. Accordingly, the term "axle bearing" is not to be considered limiting herein but merely as a particularly descriptive term since the primary use of the apparatus in all probability will be with automobile and truck axle bearings.

In modern automobiles, parts are finely engineered to small tolerances, and the trend is toward more pressed-on fits and more friction held connections. Accordingly, increasing use is found in up-to-date automotive shops of hydraulic shop presses adapted to remove and replace certain components which have pressed-on fits.

Such hydraulic shop presses are particularly useful in the removal and replacement of rear axle bearings. In this type of arrangement, the rear axle and flange generally comprise a one-piece forging and the bearing has a press-fit with a tapered portion of this forging adjacent the wheel flange. This press-fit is generally made under a pressure of approximately 8 to 10 tons. The bearings employed for this purpose generally comprise roller or ball bearings including inner and outer races, the inner race being pressed-on to the tapered surface provided on the forging.

The present invention is particularly designed to provide an extremely simple and inexpensive tool and yet at the same time one which is quite rugged and reliable in use. A pair of body portions of substantially similar construction are provided, this pair of portions cooperating to form a body means which is adapted to support a bearing, gear, pulley and the like when such means is either being removed or replaced on an associated shaft. Accordingly, the present invention provides maximum versatility in this type of application.

The axle bearing tool of the present invention is further of such a nature that it can be readily employed with conventional press structure without requiring any alterations of such a press.

Recessed portions are provided in the opposite end walls of the two body portions for receiving a shaft, and these recessed portions are formed about different radii so as to enable the apparatus to be efficiently employed with different size shafts and associated friction fit means. In addition, these recessed portions flare to a greater dimension in an inward direction so as to provide clearance with the studs of some wheel flanges as are encountered in the automatic field.

It is of course desirable to form a tool of as light a weight construction as possible and to minimize the cost thereof, and yet at the same time to provide sufficient strength and durability to withstand the forces to which this type of structure is subjected and to withstand the abuse which will commonly occur in the usual automotive shop. The body portions each comprise a ductile iron casting of high strength and in addition the opposite end walls which are subjected to the direct loading of a bearing or the like thereon are interconnected with associated side walls by a reinforced connection including a plurality of spaced ribs which tend to resist deformation of the end wall portions. A further feature of this reinforced interconnection is the fact that the points at which the ribs intersect the associated end walls are substantially equally spaced from the recessed portion provided in the particular end wall so as to provide an equal distribution of forces to these various components so that no particular area of the structure will become overloaded.

The arrangement of the present invention enables bearings to be removed in a fast and safe manner, and a safety shield means is adapted to be associated with the body portions so that an operator will not be harmed if a bearing should explode while being removed from an associated shaft.

The present invention also provides an effective solution to a difficult problem often encountered in removing axle bearings. The outer race of the bearing may break loose from the inner race, and it subsequently becomes necessary to remove only the inner race. In order to accomplish the removal of only the inner race, the present invention incorporates a clamping means which is adapted to cooperate with the two body portions to hold the body portions in a particular spaced relationship so that they cannot move away from one another while the inner race is being removed from the associated shaft. It is necessary to provide such a clamping means since when removing an inner race, a camming force is generated which normally tends to force the two body portions away from one another.

An object of the present invention is to provide a new and novel axle bearing tool for use with a press which is adapted to remove not only axle bearings, but also to remove gears, pulleys and other friction held devices from associated shafts.

Another object of the invention is the provision of an axle bearing tool which is adapted to be used for both the removal and replacement of rear axle bearings.

A further object of the invention is to provide an axle bearing tool which can be used with a conventional hydraulic shop press without altering the press structure.

Still another object of the invention is the provision of an axle bearing tool which is adapted to be readily employed with shafts and friction held devices of different size and further which provides clearance when employed with certain wheel flanges.

Yet another object of the invention is the provision of an axle bearing tool of reinforced construction to resist deformation of certain working surfaces thereof and wherein the arrangement provides an equal distribution of forces throughout the structure.

Still another object of the invention is to provide an axle bearing tool which enables fast and safe removal of bearings.

Yet a further object of the invention is the provision of an axle bearing tool which can readily remove the inner race of a bearing after the outer race has been broken off.

A still further object of the invention is the provision of an axle bearing tool which is quite simple and inexpensive in construction, and yet which at the same time is quite rugged and reliable in use.

Other objects and many attendant advantages of the invention will become more apparent when considered in connection with the specification and accompanying drawings, wherein:

FIG. 1 is a top perspective view illustrating the axle bearing tool of the present invention mounted in operative position on a hydraulic shop press;

FIG. 2 is a sectional view taken substantially along line 2—2 of FIG. 1 looking in the direction of the arrows;

FIG. 3 is a sectional view taken substantially along line 3—3 of FIG. 2 looking in the direction of the arrows;

FIG. 4 is a sectional view taken substantially along line 4—4 of FIG. 2 looking in the direction of the arrows;

FIG. 5 is a sectional view similar to FIG. 2 and illustrating the apparatus as being employed for replacing a bearing on an axle;

FIG. 6 is a front view of the tool as employed with a hydraulic shop press and wherein a gear is being removed from an associated shaft;

FIG. 7 is a top perspective view illustrating the tool in operative position for removing only the inner race of an axle bearing from the associated shaft;

FIG. 8 is a sectional view taken substantially along line 8—8 of FIG. 7 looking in the direction of the arrows;

FIG. 9 is a sectional view taken substantially along line 9—9 of FIG. 8 looking in the direction of the arrows;

FIG. 10 is a sectional view taken substantially along line 10—10 of FIG. 8 looking in the direction of the arrows; and FIG. 11 is a top perspective view partly broken away illustrating one body portion of the tool of the present invention.

Referring now to the drawings wherein like reference characters designate corresponding parts throughout the several views, FIGS. 1–4 illustrate the tool in operative position on a hydraulic shop press indicated generally by reference numeral 20. The press includes a pair of substantially parallel base members 22 and 24 each of which comprises a rigid angle member, these base members being interconnected adjacent the opposite ends thereof by cross brace members 26, one of which is visible in FIG. 1.

The press includes a pair of upstanding channel members 28 and 30, channel member 28 being suitably secured at the lower end thereof to the base member 22 as by nut and bolt assemblies 32, and channel member 30 being similarly secured at the lower end thereof to base member 24.

A first channel member 40 is secured to one side of the upper ends of channel members 28 and 30 as by means of nut and bolt assemblies extending through suitable holes provided in channel members 28 and 30. In a similar manner, a channel member 44 is disposed parallel to channel member 40 and is secured to the upper ends of channel members 28 and 30 by nut and bolt assemblies 46.

A plate 50 is secured to the lower portions of channel members 40 and 44 as by nut and bolt assemblies 52 extending through the lower leg portions of each of channel members 40 and 44. A pair of upstanding guide members 54 and 56 extend through suitable holes provided in plate 50 and are provided with enlarged head portions 54 and 56' at the lower ends thereof.

A crosshead 60 is suitably fixed to the upper ends of guide members 54 and 56, and a hydraulic cylinder is indicated by reference numeral 62, this cylinder being mounted upon a base plate 64 which has suitable holes therein for receiving the guide portions 54 and 56, whereby the base plate and supported hydraulic cylinder are mounted for slidable movement in a vertical direction and are guided in such movement by the guide members 54 and 56. A spring member 66 engages the undersurface of base plate 64 for normally urging the base plate and hydraulic cylinder in an upward direction. The spring member 66 may be supported at its lower end by a guide block or the like which in turn is supported on plate 50.

A manually operable handle 70 extends outwardly of hydraulic cylinder 62 and may be operated in the manner of a conventional hydraulic jack. The upper end of the piston within the hydraulic cylinder is indicated by reference numeral 72 and engages the undersurface of the crosshead 60. A plunger 74 is fixed to and extends downwardly from the base plate 64 and has a lower working end portion 76 adapted to engage the end of a shaft during operation of the press. This plunger portion 74 may extend through a suitable guide block mounted on plate 50.

A pair of support members 80 and 82 are provided, each of these members being a channel member, these support members in turn being supported by pins 84 and 86. Pin 84 extends through aligned holes 28' provided in the opposite leg portions of channel member 28, and pin 86 extends through aligned holes 30' provided in the opposite leg portions of channel member 30. These pin members may be removed from such aligned holes and placed in other holes when it is desired to adjust the vertical position of the support members 80 and 82. As seen particularly in FIG. 2, pin 84 is provided with an integral projection 84' which limits movement thereof to the right as seen in this figure. Pin 86 may be provided with a similar projection so that the support pins will be properly positioned.

The support members 80 and 82 are maintained in the proper spaced relationship by nut and bolt assemblies 90, which as seen more particularly in FIG. 2 include bolts 92 extending through suitable holes provided in the support members 80 and 82 and extending through tubular spacer members 94 positioned between the channel members 80 and 82, nuts 96 being threaded on the outer threaded ends of the bolts 92.

The axle bearing tool comprises a body means including a pair of body portions 100 and 100' which are of substantially similar construction, the body portion 100' being given the same reference numerals primed as applied to the various portions of body portion 100. These body portions are cast from high tensile, high carbon ductile iron for rigidity and strength. Referring to FIG. 11, the details of construction of body portion 100 are illustrated. This body portion includes opposite end walls 102 and 104 which are provided with outwardly facing substantially flat surfaces 106 and 108 respectively. These flat surfaces 106 and 108 are adapted to rest upon the support members 80 and 82 of the press and to also support a portion of a friction held device being removed from or placed on an associated shaft.

The opposite end walls 102 and 104 are spaced from one another and interconnected by a plurality of side walls 110, 112 and 114. It will be noted that side wall 114 is disposed substantially perpendicular to the parallel side walls 110 and 112. It will further be noted that these three side walls cooperate to define a cavity within the body portion and that the body portion includes an open side area opposite to and parallel with the side wall 114.

End wall 106 is provided with a central recessed portion 120 which defines an arc of a circle of less than 180 degrees, or in other words, this arcuate portion 120 is less than semi-circular in configuration. This recessed portion flares outwardly and inwardly as indicated by reference numeral 122 to provide clearance with the studs formed on some wheel flanges on axles employed with the tool.

In a similar manner, the end wall 104 is provided with a central recessed portion 124. This recessed portion 124 also defines an arc of a circle of less than 180 degrees. It will be noted that the radius on which recessed portion 124 is formed is less than the radius on which recessed portion 120 is formed, these recessed portions accordingly being of different size and being suitable for accommodating shafts of different diameter. The recessed portion 124 flares outwardly and inwardly of the body portion to provide clearance with the studs on some wheel flanges.

The side wall 114 is interconnected with end wall 104 by a reinforced connection comprising three spaced ribs 130 which are inwardly directed as seen in FIG. 11, the ribs being equally spaced from one another. As noted in FIG. 11, the distances from the recessed portion 126 to the points at which the ribs intersect the end wall 104 are indicated by the reference characters $x$, $y$ and $z$. These distances are substantially equal so that the forces will be substantially evenly distributed throughout the body portion. It is apparent that the ribs 130 will tend to resist deformation of the end wall under load.

Three substantially identical ribs 132 are provided between the side wall 114 and the end wall 102 and are similarly related to one another and to the recessed portion 120 so as to function in the same manner as ribs 130.

In FIGS. 1–4, the apparatus is illustrated as mounted in operative position to function in association with a rear axle 140 which has a wheel flange 142 formed at the lower end thereof from which extend studs 144. The axle includes an integral tapered portion 146 on which is press fitted a bearing indicated generally by reference numeral 148. This bearing rests upon the flat upper surface of end walls 106 and 106′ of the two body portions, and the tapered section 146 extends through the opening defined by the central recessed portions provided in the upper end walls of the body portions. It should be noted at this point that as seen in FIG. 3 the two body portions are illustrated as disposed in abutting relationship, although they need not be in such relationship as will appear hereinafter. When in such abutting relationship, it is apparent that the recessed portions 120 and 120′ will cooperate to define a generally oval-shaped opening which will receive the tapered portion 146 of the axle. It will also be noted that when in this operative position, the wheel flange is disposed within the enclosed cavity defined by the two body portions, and that the wheel flange is adapted to move downwardly therewithin as indicated by the arrows in FIG. 4.

When the apparatus is in the operative position shown in FIGS. 1–4, the handle 70 may be manipulated so as to cause the piston 72 to be extended therefrom which will force the plunger 74 downwardly, and in turn will engage the upper end of the axle 140 to force it downwardly. As the axle moves downwardly, the bearing 148 is held in place by the two body portions, and accordingly, the axle may move downwardly into the phantom line position illustrated in FIG. 2 so as to release the bearing from the tapered portion 146 of the axle. The pressure may then be released from the upper end of the axle, and the two body portions separated from one another so as to remove the axle and bearing therefrom, whereupon the bearing may be simply slid off of the axle.

Referring now to FIG. 5 of the drawings, the hydraulic press and tool construction are the same as that previously described. In this figure, the apparatus is shown in position to replace a bearing upon an axle. An axle 140′ similar to axle 140 is provided, but in this instance is mounted so that it extends upwardly through the tool with the wheel flange 142′ and studs 144′ disposed above the tool. The bearing 148′ similar to the bearing 148 previously described is disposed loosely about the tapered portion 146′ of the axle, and the lower end of plunger 74 engages the upper surface of the wheel flange. Downward movement of plunger 74 will cause the axle to move downwardly with respect to the bearing 148′, whereby the bearing is press fitted onto the tapered portion 146′.

Referring now to FIG. 6, a further mode of operation of the apparatus is illustrated. In this figure, the press and tool are identical with that previously described. A gear 150 is press fitted on a shaft 152, and as seen in FIG. 6, this gear is supported on the upper support surfaces of the two body portions with the shaft 152 extending downwardly within the space defined between the body portions.

The lower end 76 of plunger 74 engages the upper end of shaft 152, and upon downward movement of the plunger 74, the shaft 152 will be moved downwardly with respect to the gear 150 so as to release the gear from its press fit with the shaft.

Referring now to FIGS. 7–10 inclusive, the apparatus is illustrated as employed for removing the inner race of a bearing after the outer race thereof has been accidentally broken off for one reason or another. An axle 160 is provided with a tapered portion 162 and a wheel flange 164 at the outer end thereof which has studs 166 extending therefrom. The inner race of the bearing is indicated by reference numeral 170, this inner race being press fitted on the tapered portion 162.

The body portions 100 and 100′ are illustrated in operative position with the end walls 106 and 106′ thereof supporting the inner race 170. As shown in these figures, the body portions are spaced from one another, and it should be understood that they may be spaced from one another during any type of operation if so desired. Since a downward force on the inner race tends to cam the two body portions apart as will be evident from an inspection of FIG. 8, it is necessary to provide a clamping means for holding the body portions in operative position. The clamping means in this form of the invention includes a pair of clamping members 174 and 176 and a stud 178. The stud includes a first threaded end portion 180 which may be threaded through a suitable threaded opening 182 provided in clamping member 174. Stud 178 includes an opposite threaded end portion 184 which may be threaded through a suitable threaded opening 186 provided in clamping member 176.

It is apparent that the clamping members 174 and 176 may be threaded on the opposite ends of the stud 178 into the position shown in FIG. 8 wherein they hold the body portions 100 and 100′ in the operative relation shown so that they cannot move away from one another when downward pressure is applied to the axle and the inner race 170 fitted thereon.

A further feature of the arrangement shown in FIGS. 7–10 is the provision of a safety shield means indicated generally by reference numeral 190. This safety shield means is also cast from high tensile, high carbon ductile iron so as to be quite strong and is generally cup-shaped in configuration, including a substantially frusto-conical side wall portion 192 and an end wall portion 194 having a hole 196 formed through the central portion thereof for receiving the axle. It is apparent that when the safety shield is mounted in the operative position shown in FIG. 8, personnel operating the apparatus will be protected since if the inner race should shatter, it cannot fly outwardly to damage anyone standing in the immediate vicinity. This safety shield thereby provides positive protection from injury to an operator.

It is apparent from the foregoing that there is provided according to the present invention an axle bearing tool which is particularly adapted for removing and replacing rear axle bearings, but which can also be readily employed for removing gears, pulleys and many other friction held devices from associated shafts. The tool of the present invention can be employed with conventional press structure without any alteration in the press. The tool is designed to be employed with bearings, gears, pulleys and associated shafts of different sizes, and a flare is provided in the recessed portions of the working surfaces of the tool to provide clearance with the studs of some wheel flanges employed with the apparatus. The ribs provided in each of the body portions provide a reinforced structure which resists deformation of the opposite end walls or working surfaces, and further which ensures that a substantially equal distribution of forces will be provided throughout the body portions. The arrangement of the present invention enables the fast and safe removal of bearings, the safety shield means of the apparatus providing positive protection against injury to personnel. The clamping arrangement of the invention in cooperation with the two body portions enables the inner race of a bearing to be readily removed even after the outer race has been broken off. The apparatus of the present invention is quite simple and inexpensive in construction, and yet at the same time is quite rugged and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An axle bearing tool for use with a press comprising body means including first and second portions of substantially similar construction and each being formed of a strong rigid material, each of said body portions including spaced opposite end walls each of which defines an outwardly facing substantially flat surface, said end walls being interconnected with one another by side wall portions, said side wall portions defining an open side area in each of said body portions, each of said opposite end walls including a recessed portion formed in the central part of the side edge thereof at said open side area for receiving a shaft.

2. Apparatus as defined in claim 1 wherein each of said recessed portions flares outwardly to a greater dimension in a direction inwardly away from the outwardly facing surface of the associated end wall.

3. Apparatus as defined in claim 1 including a generally cup-shaped safety shield supported on the upwardly facing surface of one of said end walls of each of said body portions, said safety shield being disposed with the open end thereof facing downwardly, the opposite closed end of the safety shield having a hole formed therein through which a shaft is adapted to extend.

4. Apparatus as defined in claim 1 including clamping means for holding said first and second body portions in a particular spaced relationship and preventing said first and second body portions from moving away from one another.

5. Apparatus as defined in claim 1 wherein each of said opposite end walls is interconnected with certain parts of said side wall portions by a reinforced connection including a plurality of spaced inwardly directed ribs.

6. Apparatus as defined in claim 5 wherein the inner ends of said ribs where they intersect said opposite end walls are spaced substantially equidistantly from the recessed portion of the associated end wall.

7. Apparatus as defined in claim 1 wherein said central recessed portion defines an arc of a circle and is less than semi-circular in configuration.

8. Apparatus as defined in claim 7 wherein the recessed portions formed in said opposite end walls are formed about radii of different length.

9. Apparatus as defined in claim 1 wherein said side wall portions include a plurality of side walls angularly related to one another, each of said opposite end walls being interconnected with said side wall portions by a reinforced connection including a plurality of spaced ribs extending inwardly from said walls, the inner ends of said ribs where they intersect an end wall being substantially equidistantly spaced from the recessed portion formed in the associated end wall.

10. Apparatus as defined in claim 9 wherein the central recessed portion formed in each of said end walls defines an arc of a circle of less than 180 degrees, the recessed portion in one end wall of each body portion being formed of a greater radius than that formed in the opposite end wall, each of said recessed portions flaring outwardly and inwardly to a greater dimension to provide clearance with an associated member.

References Cited
UNITED STATES PATENTS

| | | | |
|---|---|---|---|
| 2,807,080 | 9/1957 | Mathews | 29—251 |
| 3,008,226 | 11/1961 | Kellerman | 29—201 |
| 3,052,955 | 9/1962 | McAndrews et al. | 29—201 X |
| 3,103,064 | 9/1963 | Hawkins | 29—283 X |
| 3,174,218 | 3/1965 | McConaha | 29—256 |
| 3,191,259 | 6/1965 | Dalton | 29—201 |
| 3,283,699 | 11/1966 | Hawkins | 100—214 |

THOMAS H. EAGER, *Primary Examiner.*